US012488921B1

(12) United States Patent
Pegouske et al.

(10) Patent No.: US 12,488,921 B1
(45) Date of Patent: Dec. 2, 2025

(54) MAGNETIC APPARATUS FOR MOUNTING ON CURVED FERROMAGNETIC SURFACES

(71) Applicant: The United States of America as Represented by the Secretary of the Navy, Indian Head, MD (US)

(72) Inventors: Adam Pegouske, White Plains, MD (US); Lee Foltz, Indian Head, MD (US); Bruce Strackbein, Arnold, MD (US); Mike Shattuck, Port Royal, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 398 days.

(21) Appl. No.: 18/445,362

(22) Filed: Aug. 1, 2023

(51) Int. Cl.
*H01F 7/02* (2006.01)

(52) U.S. Cl.
CPC .................................. *H01F 7/0252* (2013.01)

(58) Field of Classification Search
CPC ..................................................... H01F 7/0252
See application file for complete search history.

(56) References Cited

U.S. PATENT DOCUMENTS 3,889,220 A 6/1975 Spodig

FOREIGN PATENT DOCUMENTS

WO WO-2014135902 A1 * 9/2014 ........... H01F 7/0221
WO 0003951 1/2020

* cited by examiner

*Primary Examiner* — Mohamad A Musleh
(74) *Attorney, Agent, or Firm* — Fredric J. Zimmerman

(57) ABSTRACT

A magnetic apparatus for magnetic attachment to a curved ferromagnetic surface. The magnetic apparatus includes a plurality of ferromagnetic plates and a plurality of magnets. Each ferromagnetic plate includes a concave end for mounting on a curved ferromagnetic surface. The ferromagnetic plates and magnets are in an alternating arrangement where each magnet is positioned between a pair of the ferromagnetic plates. The magnets are oriented such that like magnetic poles of the magnets oppose each other. Each magnet is sized so that the magnet does not contact the curved ferromagnetic surface. The magnetic apparatus includes an assembly for joining the ferromagnetic plates and magnets together. Each magnet firmly abuts the pair of the ferromagnetic plates thereby allowing the ferromagnetic plates to become magnetically saturated. The magnetic apparatus includes a load-spreading member attached to all of the ferromagnetic plates for distributing loads among the ferromagnetic plates.

20 Claims, 9 Drawing Sheets

MAGNETIC APPARATUS FOR MOUNTING ON CURVED FERROMAGNETIC SURFACES

STATEMENT OF GOVERNMENT INTEREST

The invention described herein may be manufactured and used by or for the Government of the United States of America for governmental purposes without the payment of any royalties.

CROSS REFERENCE TO OTHER PATENT APPLICATIONS

None.

FIELD OF THE INVENTION

The present disclosure is directed to a magnetic apparatus for mounting on curved, ferromagnetic surfaces.

BACKGROUND

It is often necessary to attach tools, lines and other equipment to ferromagnetic round, cylindrical or spherical objects such as pipes, conduits, rods, tubes and military ordnance (e.g., shells, rockets, etc.). One technique is to mount such tools, lines or other equipment to the round, cylindrical or spherical objects using magnets. Conventional techniques entail the use of relatively large magnets that are custom designed to fit on a specific curved ferromagnetic surface. However, custom designing and fabricating magnets is an expensive process. Furthermore, custom designing magnets requires fabricating many different sized magnets for various curved ferromagnetic surfaces having different diameters or shapes.

What is needed is a new and improved apparatus for attaching tools, lines and other equipment to round, cylindrical or spherical ferromagnetic objects that eliminates the problems and disadvantages associated with conventional techniques.

SUMMARY

A summary of certain exemplary embodiments disclosed herein is set forth below. It should be understood that these aspects are presented merely to provide the reader with a brief summary of these certain embodiments and these aspects are not intended to limit the scope of this disclosure or the claimed subject matter. Indeed, this disclosure may encompass a variety of aspects that may not be set forth below.

Disclosed herein are embodiments of a magnetic apparatus for mounting on curved, ferromagnetic surfaces. In an exemplary embodiment disclosed herein, the magnetic apparatus includes a plurality of ferromagnetic plates and a plurality of magnets. Each ferromagnetic plate has a concave end for mounting on a curved ferromagnetic surface. The ferromagnetic plates and magnets are in an alternating arrangement where each magnet is positioned between a pair of the ferromagnetic plates. The magnets are oriented such that like magnetic poles of the magnets oppose each other. Each magnet is sized such that the magnet does not contact the curved ferromagnetic surface. The magnetic apparatus further includes an assembly for joining the ferromagnetic plates and magnets together so that each magnet firmly abuts the pair of the ferromagnetic plates thereby allowing the ferromagnetic plates to become saturated, magnetically. In some exemplary embodiments, the magnetic apparatus further includes a load-spreading member that is attached to all of the ferromagnetic plates for distributing loads among all of the ferromagnetic plates.

In some embodiments, the magnetic apparatus for mounting on curved, ferromagnetic surfaces includes a plurality of ferromagnetic plates and a plurality of magnets that are in an alternating arrangement such that each magnet is positioned between a pair of the ferromagnetic plates. The magnets are oriented so that the north pole of each magnet opposes the north pole of another magnet and the south pole of each magnet opposes the south pole of another magnet. Each ferromagnetic plate has an inwardly curved end for mounting on a curved ferromagnetic surface. Each magnet is configured as a bar magnet that is sized so as to preclude the magnet from contacting the curved ferromagnetic surface. The magnetic apparatus includes an assembly for joining the ferromagnetic plates and magnets together such that each magnet firmly abuts the pair of the ferromagnetic plates thereby allowing the ferromagnetic plates to become magnetically saturated.

In some embodiments, the magnetic apparatus for mounting on a curved, ferromagnetic surface includes a plurality of ferromagnetic plates. Each ferromagnetic plate has a first thru-hole, a second thru-hole and an inwardly curved end for placement on a curved ferromagnetic surface. The magnetic apparatus further includes a plurality of magnets in an alternating arrangement with the ferromagnetic plates such that each magnet is positioned between a pair of the ferromagnetic plates. The magnets are oriented such that like magnetic poles of the magnets oppose each other. Each magnet is sized so that the magnet does not contact the curved ferromagnetic surface. Each magnet has a first thru-hole and a second thru-hole, where the first thru-hole of each ferromagnetic plate is aligned with the first thru-hole of each magnet and where the second thru-hole of each ferromagnetic plate is aligned with the second thru-hole of each magnet. The magnetic assembly further includes an assembly for joining the ferromagnetic plates and magnets together so that each magnet firmly abuts the pair of the ferromagnetic plates thereby allowing the ferromagnetic plates to become magnetically saturated. The assembly includes a first elongate member extending through the first thru-holes of the ferromagnetic plates and magnets and a first set of fasteners engaged with the first elongate member to retain the first elongate member within the first thru-holes of the ferromagnetic plates and magnets. The assembly further includes a second elongate member extending through the second thru-holes of the ferromagnetic plates and the magnets and a second set of fasteners engaged with the second elongate member to retain the second elongate member within the second thru-holes of the ferromagnetic plates and the magnets.

DETAILED DESCRIPTION

As used herein, the terms "comprise", "comprising", "comprises", "includes", "including", "has", "having" or any other variation thereof, are intended to cover a non-exclusive inclusion. For example, a process, method, article or apparatus that comprises a list of elements is not necessarily limited to only those elements, but may include other elements not expressly listed or inherent to such process, method, article or apparatus.

Approximating language, as used herein throughout the specification and claims, may be applied to modify any quantitative representation that could permissibly vary without resulting in a change in the basic function to which it is related. Accordingly, a value modified by a term such as "about" or "approximately" is not limited to the precise value specified.

Reference in the specification to "an exemplary embodiment", "one embodiment," "an embodiment" or "some embodiments", means that a particular feature, structure or characteristic described in connection with the embodiment is included in at least one embodiment of the invention. The appearances of the phrases "an exemplary embodiment", "one embodiment", "embodiment" or "some embodiments" in various places in the specification are not necessarily all referring to the same embodiment.

Figure 1:
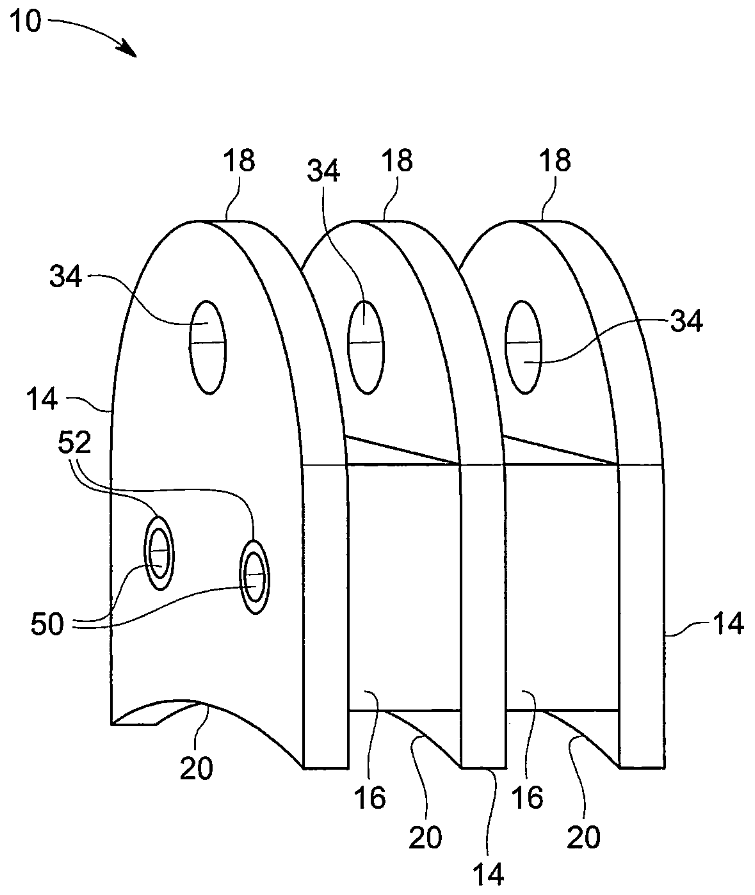
FIG. 1 illustrates a perspective view of a magnetic apparatus for mounting on curved, ferromagnetic surfaces in accordance with an exemplary embodiment of the present disclosure.
Figure 2:
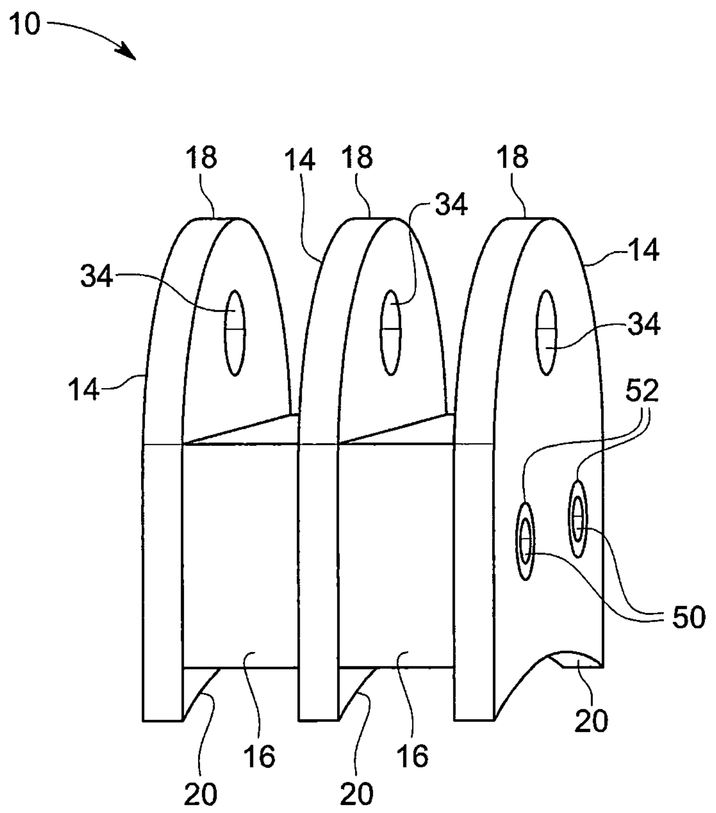
FIG. 2 illustrates another perspective view of the magnetic apparatus.
Figure 3A:
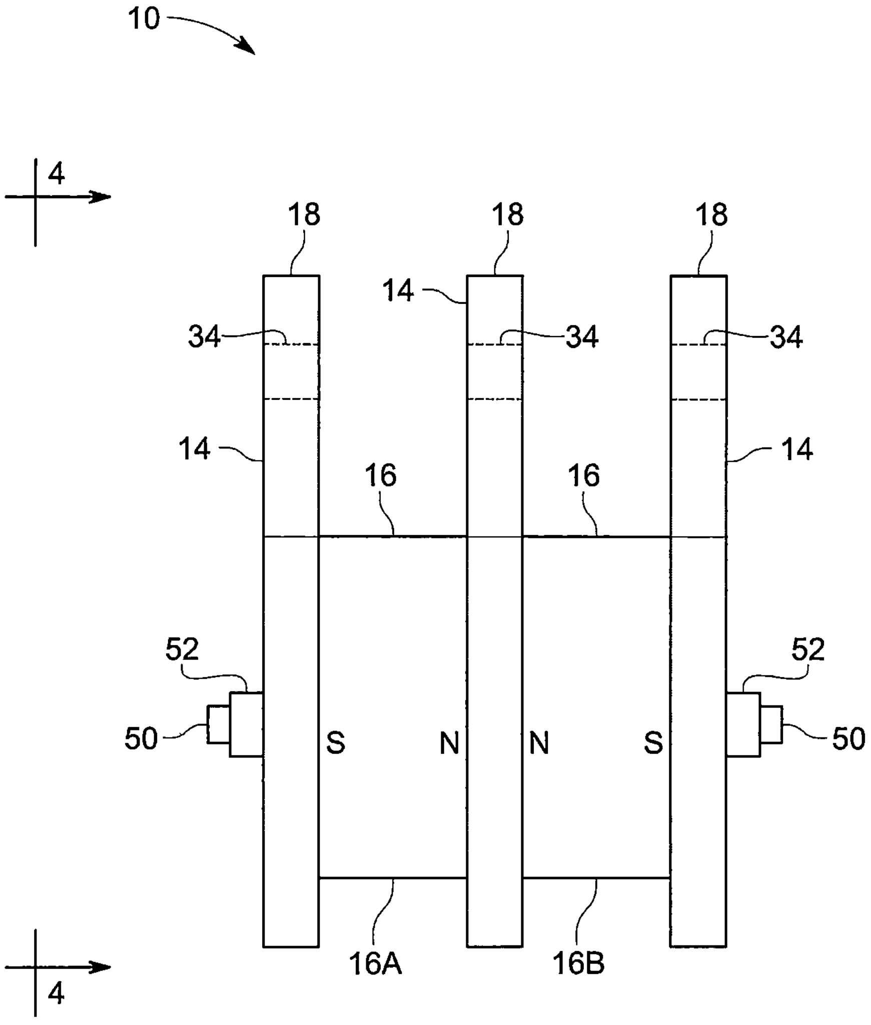
FIG. 3A illustrates a front elevational view of the magnetic apparatus.
Figure 3B:
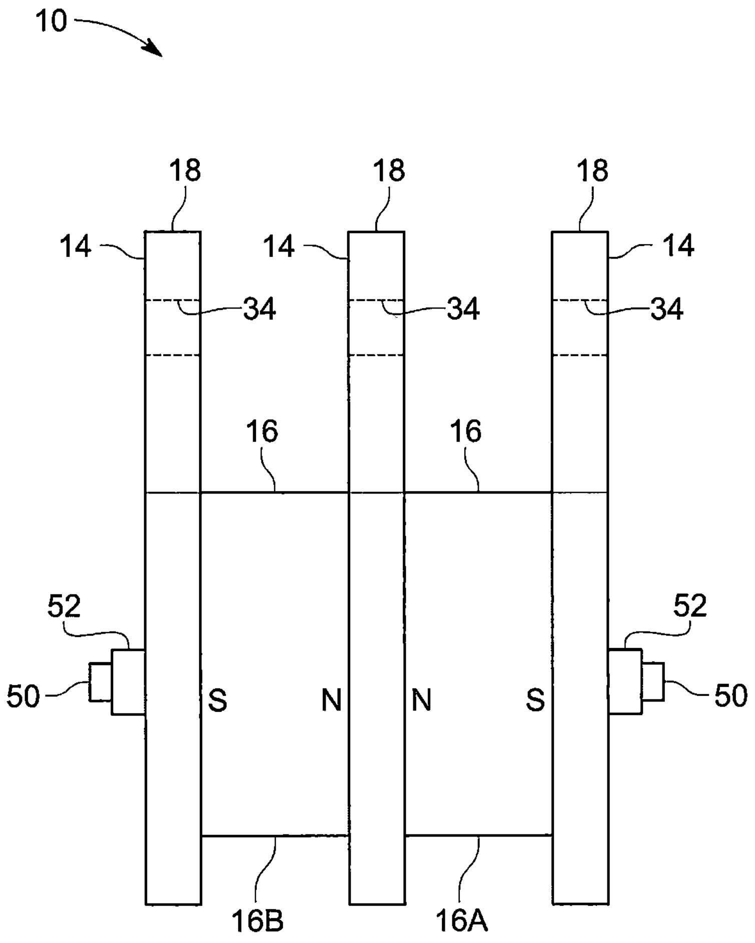
FIG. 3B illustrates a rear elevational view of the magnetic apparatus.
Figure 4:
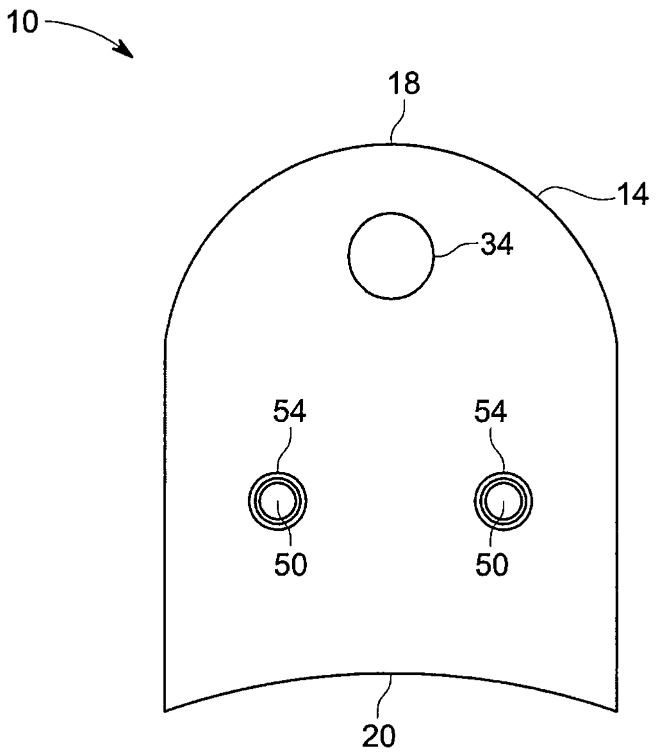
FIG. 4 illustrates a right-side elevational view of the magnetic apparatus taken along line 4-4 of FIG. 3A, the left-side elevational view being identical to the right-side elevational view.
Figure 5A:
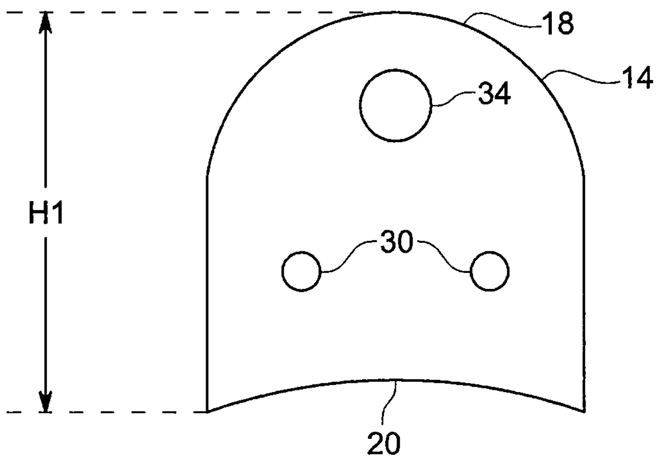
FIG. 5A illustrates a front elevational view of a ferromagnetic plate in accordance with an exemplary embodiment of the present disclosure.

Referring to FIGS. 1, 2, 3A, 3B and 4, there is shown magnetic apparatus 10 in accordance with an exemplary embodiment of the present disclosure. Magnetic apparatus 10 is configured to be mounted on member 12 and magnetically bonded to curved, ferromagnetic surface 13 of member 12 (see FIG. 6) as will be discussed in detail in the ensuing description. Magnetic apparatus 10 includes N ferromagnetic plates 14, where N≥2, and N−1 magnets is designated as "magnets" with element number 16. Ferromagnetic plates 14 and magnets 16 are in an alternating arrangement such that each magnet 16 is positioned between a pair of ferromagnetic plates 14. The exemplary embodiment shown in FIGS. 1-4 has three ferromagnetic plates 14 and two magnets 16. It is to be understood that magnetic apparatus 10 may be configured with a different number of ferromagnetic plates 14 and magnets 16. For example, there may be four ferromagnetic plates 14 and three magnets 16. In another example, there may be five ferromagnetic plates 14 and four magnets 16. In a further example, there may be six ferromagnetic plates 14 and five magnets 16. Hence, magnetic apparatus 10 may be configured with as many ferromagnetic plates 14 and magnets 16 as necessary in order to achieve the desired objective for a given application. Magnets 16 are oriented so that like poles oppose each other (e.g., N-N and S-S) thereby effecting multiplication of the magnetic force of a single magnet and facilitating magnetic saturation of ferromagnetic plates 14. This configuration is illustrated in FIGS. 3A and 3B where magnets 16 are also indicated by reference numbers 16A and 16B and the north pole "N" of magnet 16A opposes the north pole "N" of magnet 16B. In an alternate embodiment, magnets 16A and 16B may be oriented so that the south pole "S" of magnet 16A opposes the south pole "S" of magnet 16B. The embodiment shown in FIG. 7A has five ferromagnetic plates 14 and four magnets 16 which are arranged so that the north pole "N" of each magnet 16 opposes the north pole "N" of another magnet 16 and the south pole "S" of each magnet 16 opposes the south pole "S" of another magnet 16. Each ferromagnetic plate 14 is fabricated from ferromagnetic metals. Suitable ferromagnetic metals at least include, but are not limited to, ferrous steel, iron, nickel, cobalt and alloys thereof. In some embodiments, each ferromagnetic plate 14 has a thickness between about 0.0625 inch and about 0.125 inch. However, each ferromagnetic plate 14 may have a thickness that is outside of the aforementioned range of thicknesses. The actual thickness and height H1 of each ferromagnetic plate 14 may vary depending on the length of magnetic apparatus 10' and the size of each magnet 16. As illustrated in FIG. 5A, each ferromagnetic plate 14 has curved upper end 18 and an inwardly curved or concave lower end 20 that is configured for placement or mounting on curved ferromagnetic surface 13 of member 12 (see FIG. 6). Each ferromagnetic plate 14 has a pair of thru-holes 30 located in the lower portion of the ferromagnetic plate 14. The purpose of thru-holes 30 is discussed in detail in the ensuing description. Each ferromagnetic plate 14 further includes thru-holes 34 located in the upper portion of ferromagnetic plate 14 which is sized to receive a load-spreading member 60 (see FIG. 6) that is discussed in the ensuing description.

Figure 5B:
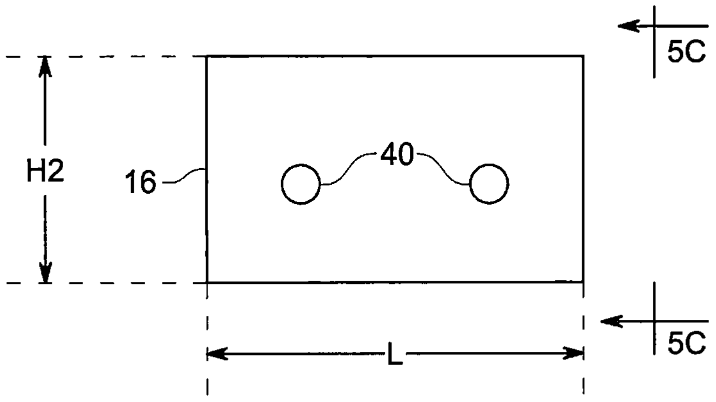
FIG. 5B illustrates a front elevational view of a magnet in accordance with an exemplary embodiment of the present disclosure.
Figure 5C:
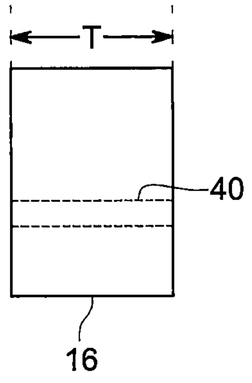
FIG. 5C illustrates an end view of the magnet taken along line 5C-5C of FIG. 5B.

Referring to FIG. 5B, in some exemplary embodiments, each magnet 16 is a N52 magnet. Suitable magnets include, but are not limited to, neodymium magnets. In some embodiments, each magnet 16 is configured as a bar magnet and has a length L of about 2.0 inches, a height H2 of about 1.0 inches and a thickness T of about 0.5 inches. However, it is to be understood that in other embodiments, magnets having other shapes (e.g., circular, triangular, etc.) also may be used. Each magnet 16 has a pair of thru-holes 40. Each thru-hole 40 is aligned with a corresponding thru-hole 30 in an adjacent ferromagnetic plate 14. The purpose of thru-holes 40 is discussed in the ensuing description. The height H2 of each magnet 16 is less than the height H1 of ferromagnetic plates 14 so as to preclude physical contact between each magnet 16 and curved, ferromagnetic surface 13.

As illustrated in FIGS. 1-4 and 6, magnetic apparatus 10 includes an assembly to join ferromagnetic plates 14 and magnets 16 together. In some embodiments, this assembly includes threaded elongate members 50 that extend through thru-holes 30 in ferromagnetic plates 14 and through thru-holes 40 in magnets 16. Corresponding fasteners (e.g., nuts) 52 are threadedly engaged with threaded elongate members 50. When fasteners 52 are tightened to the maximum degree, ferromagnetic plates 14 and magnets 16 are tightly clamped together so that each magnet 16 firmly abuts the adjacent ferromagnetic plates 14 thereby allowing each ferromagnetic plate 14 to become magnetically saturated. Each threaded elongate member 50 may be configured as a threaded rod, bolt or screw. In accordance with exemplary embodiments, threaded elongate members 50 and fasteners 52 are fabricated from non-ferrous metals. Examples of suitable non-ferrous metals include, but are not limited to, aluminum, stainless steel, brass and copper. In one exemplary embodiment, threaded elongate member 50 is a threaded rod and fasteners 52 are Nylock stainless steel nuts.

In another exemplary embodiment, each ferromagnetic plate 14 has a single thru-hole 30 and each magnet has a single thru-hole 40. In such an embodiment, the assembly to join ferromagnetic plates 14 and magnets 16 together comprise a single threaded elongate member 50.

In some embodiments, threaded elongate members 50 and threaded fasteners 50 are not used. Instead, unthreaded rods (not shown) are inserted through thru-holes 30 in ferromagnetic plates 14 and thru-holes 40 in magnets 16 and cotter pins (not shown) are inserted into radial thru-holes in each end of each unthreaded rod so as to prevent movement of the unthreaded rod.

Figure 6:
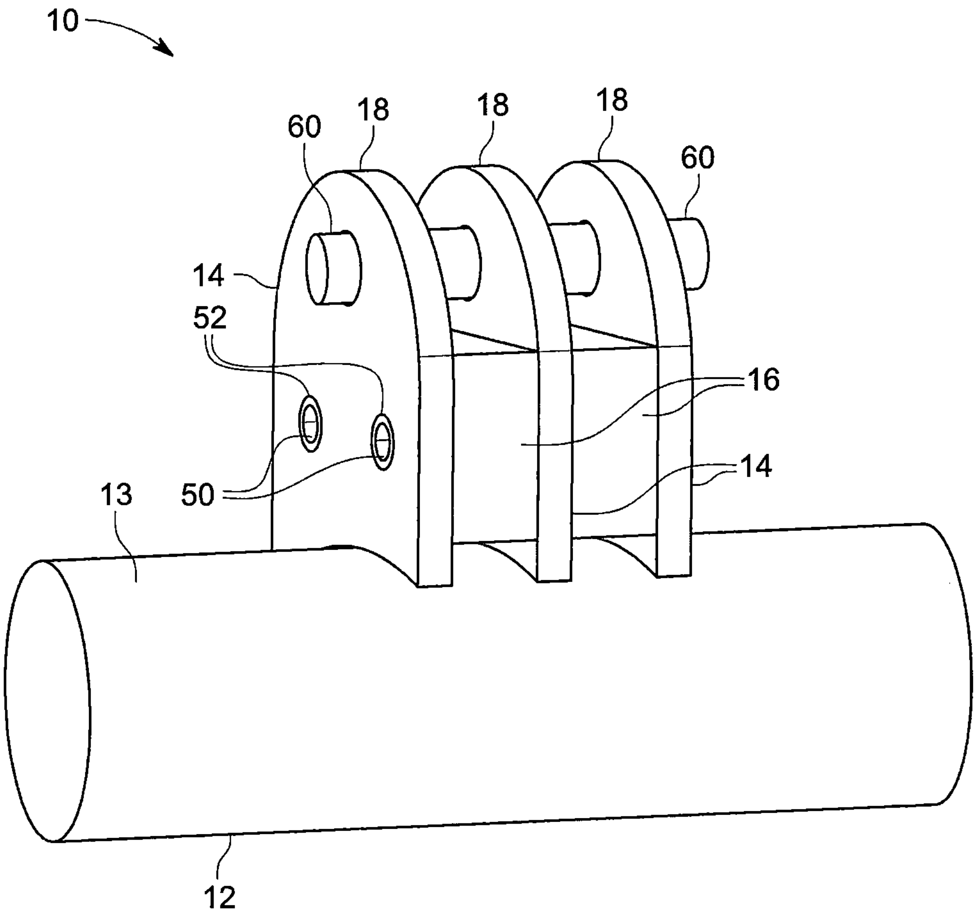
FIG. 6 illustrates a perspective view of the magnetic apparatus mounted on a curved, ferromagnetic surface.

FIG. 6 illustrates magnetic apparatus 10 magnetically attached to curved ferromagnetic surface 13 of member 12. Member 12 may have a cylindrical, spherical or round geometry and may be any one of a variety of structures or objects including, but not limited to, metal pipes, tubes or conduits, portions of machinery, steel cylindrical support columns used in the construction industry or munitions and artillery shells. The difference in the heights H1 and H2 of ferromagnetic plates 14 and magnets 16, respectively, ensures that only the ferromagnetic plates 14 will contact curved ferromagnetic surface 13 of member 12 and not magnets 16. As shown in FIG. 6, the concave end 20 of each ferromagnetic plate 14 contacts the curved ferromagnetic surface 13 but the magnets 16 do not physically contact curved ferromagnetic surface 13. The curvature of concave end 20 of each ferromagnetic plate 14 may be varied so as to conform to curved ferromagnetic surfaces having different geometries, circumferences or diameters. As a result of the alternating arrangement of ferromagnetic plates 14 and magnets 16, ferromagnetic plates 14 become magnetically saturated by the magnetic field produced by magnets 16. Consequently, ferromagnetic plates 14 become magnetically bonded to curved, ferromagnetic surface 13. Therefore, it is not necessary for magnets 16 to contact, physically, curved, ferromagnetic surface 13. The particular orientation of magnets 16 (i.e., N-N, S-S) produces an overall magnetic force that is a multiple of the magnetic force of a single magnet 16. As the quantity of ferromagnetic plates 14 and magnets 16 increase, the overall magnetic force of magnetic apparatus 10 also increases. A very important benefit of this configuration of magnetic apparatus 10 is that relatively small-sized, commercially available magnets may be used regardless of the geometry of the curved, ferromagnetic surface.

As illustrated in FIG. 6, load-spreading member 60 extends through opening 34 in each ferromagnetic plate 14. A pull-line (not shown) is attached to load-spreading member 60 and produces a load upon load-spreading member 60. Load-spreading member 60 distributes the load among all ferromagnetic plates 14 so that no one ferromagnetic plate 14 bears all the load. Load-spreading member 60 may take the form of any suitable device, such as a large bolt, rod or cylindrical bar. Load-spreading member 60 is fabricated from non-ferrous material. An example of a suitable non-ferrous material is Aluminum. Other suitable non-ferrous materials may be used as well.

Figure 7A:
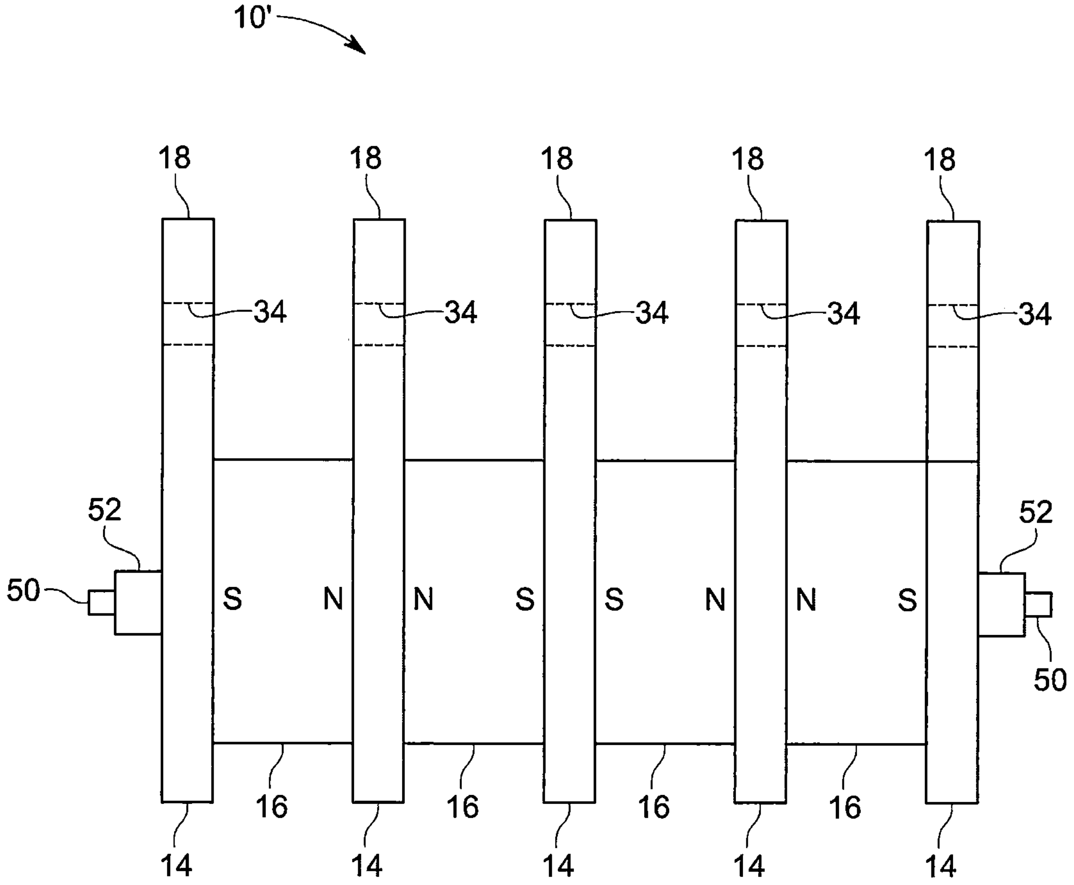
FIG. 7A illustrates a front elevational view of magnetic apparatus in accordance with another exemplary embodiment of the present disclosure.
Figure 7B:
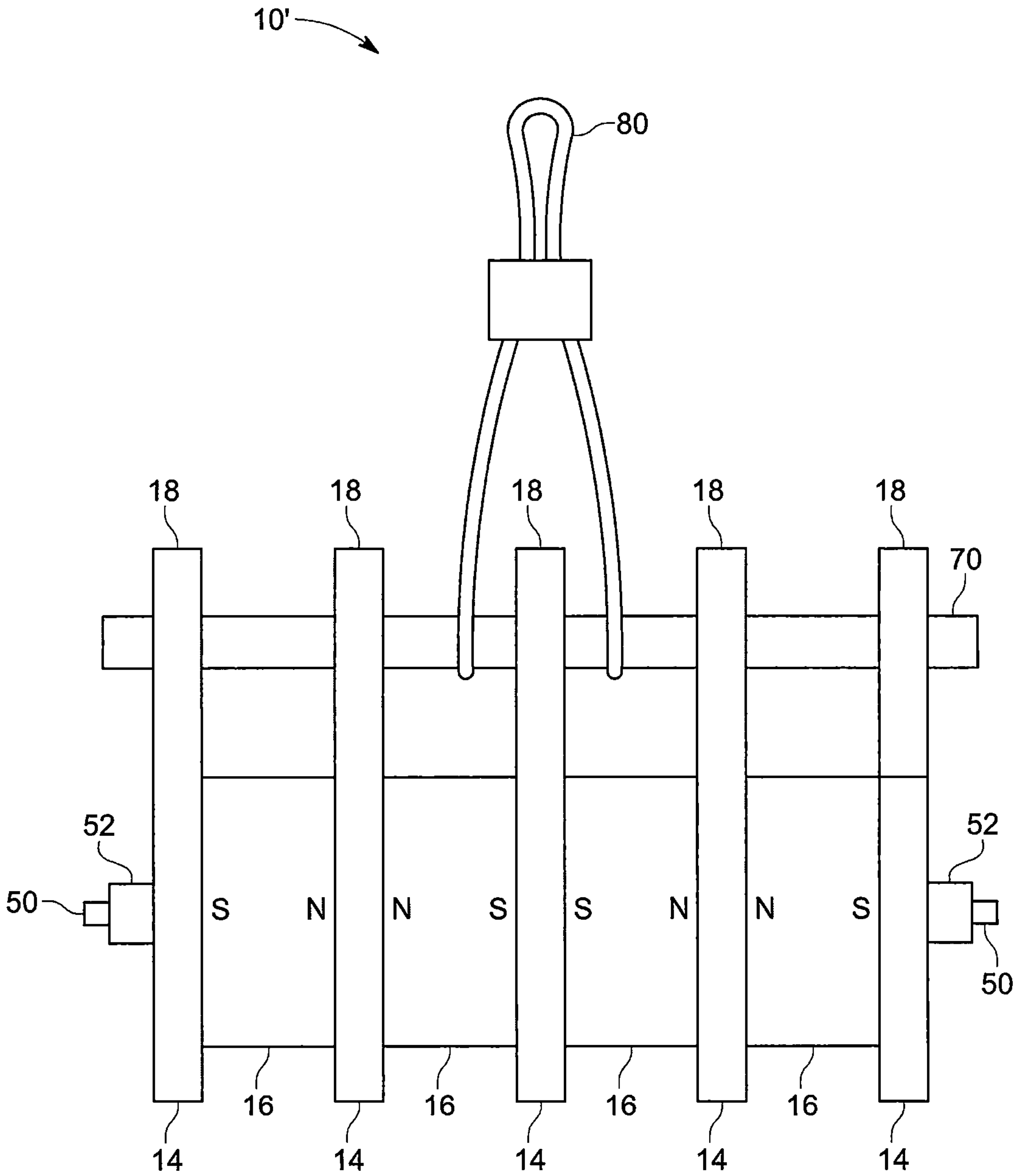
FIG. 7B is another front elevational view of the magnetic apparatus shown in FIG. 7A, wherein an elongate load-spreading member is attached to the magnetic apparatus and a pull-line is fastened to the elongate load-spreading member.

FIG. 7A illustrates another exemplary embodiment of the magnetic apparatus of the present disclosure. Magnetic apparatus 10' has five ferromagnetic plates 14 and four magnets 16 where the north pole "N" of each magnet 16 opposes the north pole "N" of another magnet 16 and the south pole "S" of each magnet 16 opposes the south pole "S" of another magnet 16. The opposition of like magnetic poles produces a significantly stronger magnetic force in comparison to that of a single magnet. The total magnetic force of magnetic apparatus 10' is at least equal to four times the magnetic force of a single magnet 16. Referring to FIG. 7B, load-spreading member 70 is disposed through thru-hole 34 in each ferromagnetic plate 14 and pull-line 80 is fastened to load-spreading member 70. Pull-line 80 may be attached to a crane, robot, ground vehicle, hoist, unmanned surface vehicle (USV) or unmanned aerial vehicle (UAE).

A series of Pull Tests were conducted on magnetic apparatus 10' shown in FIGS. 7A and 7B. Magnetic apparatus 10' was magnetically attached to a M110 155 mm high explosive projectile. Each Pull Test determines the pulling force that is required to break the magnetic bond between magnetic apparatus 10' and the M110 155 mm high explosive projectile. Each magnet 16 had a rating of 74 lbs. Each magnet 16 was rectangular in shape and had a thickness of about 0.5 inch, a height H2 of about 1.0 inch and a length L of about 2.0 inches. Each ferromagnetic plate 14 was a steel plate having a thickness of about 0.125 inch (or ⅛ inch), a length of about 2.0 inches and a height H1 of about 2.0 inches. Concave end 20 of each steel plate 14 was cut to match the curvature of the exterior ferromagnetic surface of the M110 155 mm high explosive projectile. Four separate Pull Tests were conducted. In Pull Test No. 1, a pull force of 360 lbs. was required to pull magnetic apparatus 10' from the M110 155 mm high explosive projectile. In Pull Test No. 2, a pull force of 370 lbs. was required to pull magnetic apparatus 10' from the M110 155 mm high explosive projectile. In Pull Test No. 3, a pull force of 410 lbs. was required to pull magnetic apparatus 10' from the M110 155 mm high explosive projectile. In Pull Test No. 4, a pull force of 360 lbs. was required to pull magnetic apparatus 10' from the M110 155 mm high explosive projectile.

The magnetic apparatus disclosed herein may be used to attach tools and equipment to round, cylindrical or spherical ferromagnetic objects as well as create an anchor point for remotely pulling the round, cylindrical or spherical ferromagnetic objects. Magnets 16 may be commercially available magnets thereby eliminating the need and high costs for fabricating custom designed magnets. The ferromagnetic plates 14 may be inexpensively designed to fit on curved ferromagnetic surfaces having various contours and diameters. Fabricating custom ferromagnetic plates 14 or modifying existing ferromagnetic plates 14 is significantly cheaper than designing and fabricating custom magnets. Furthermore, the total magnetic force of the magnetic apparatus disclosed herein is significantly greater than that of a single magnet and is achieved by positioning each magnet 16 between a pair of ferromagnetic plates 14 and orienting magnets 16 so that like magnetic poles oppose each other (e.g., N-N, S-S). Hence, the magnetic apparatus disclosed herein eliminates the use of large, expensive magnets. The magnetic apparatus disclosed herein is relatively light in weight, easily transportable and may be attached to the curved ferromagnetic surfaces by personnel or by an unmanned system (e.g., robot, unmanned vehicle, etc.). The magnetic apparatus disclosed herein has many uses in different fields including, but not limited to, construction industry, law enforcement (e.g., bomb squad), military explosive ordnance disposal (EOD), underwater construction and general consumer use. The magnetic apparatus disclosed herein does not utilize any environmentally toxic materials.

The foregoing description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. In this regard, while the disclosed subject matter has been described in connection with various embodiments and corresponding Figures, where applicable, it is to be understood that other similar embodiments can be used or modifications and additions can be made to the described embodiments for performing the same, similar, alternative or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A magnetic apparatus, comprising;

a plurality of ferromagnetic plates, each ferromagnetic plate includes a concave end for mounting on a curved ferromagnetic surface;

a plurality of magnets being configured in an alternating arrangement with the ferromagnetic plates, wherein each magnet is positioned between a pair of the ferromagnetic plates, wherein the magnets are oriented so that like magnetic poles of the magnets oppose each other, and wherein each magnet is sized such that the magnet does not contact the curved ferromagnetic surface; and an assembly for joining the ferromagnetic plates and magnets together so that each magnet firmly abuts said pair of the ferromagnetic plates thereby allowing the ferromagnetic plates to become magnetically saturated.

2. The magnetic apparatus according to claim 1, wherein each magnet is a rectangular shaped magnet.

3. The magnetic apparatus according to claim 1, wherein each ferromagnetic plate includes a first height and each magnet includes a second height that is less than the first height.

4. The magnetic apparatus according to claim 1, wherein each ferromagnetic plate has at least one thru-hole and each magnet has at least one thru-hole, and wherein the assembly comprises an elongate member extending through the thru-holes of the ferromagnetic plates and magnets, and a set of fasteners engaged with the elongate member to retain the elongate member within the thru-holes of the ferromagnetic plates and magnets.

5. The magnetic apparatus according to claim 4, wherein the elongate member is configured with threads and the set of fasteners are threadedly engaged with the elongate member.

6. The magnetic apparatus according to claim 1, wherein each ferromagnetic plate has a first thru-hole and a second thru-hole and each magnet has a first thru-hole and a second thru-hole, wherein the first thru-hole of each ferromagnetic plate is aligned with the first thru-hole of each magnet, wherein the second thru-hole of each ferromagnetic plate is aligned with the second thru-hole of each magnet, and wherein the assembly comprises:

a first elongate member extending through the first thru-holes of the ferromagnetic plates and magnets;

a first set of fasteners being engaged with the first elongate member to retain the first elongate member within the first thru-holes of the ferromagnetic plates and magnets;

a second elongate member extending through the second thru-holes of the ferromagnetic plates and the magnets; and a second set of fasteners engaged with the second elongate member to retain the second elongate member within the second thru-holes of the ferromagnetic plates and the magnets.

7. The magnetic apparatus according to claim 6, wherein the first elongate member and second elongate member are configured with threads, and wherein the fasteners of the first set of fasteners are threadedly engaged with the first elongate member and the fasteners of the second set of fasteners are threadedly engaged with the second elongate member.

8. The magnetic apparatus according to claim 1, further comprising a load-spreading member being attached to all of the ferromagnetic plates for distributing loads among the ferromagnetic plates.

9. The magnetic apparatus according to claim 8, wherein each ferromagnetic plate has a thru-hole therein, and wherein the load-spreading member is disposed within the thru-hole of each ferromagnetic plate.

10. The magnetic apparatus according to claim 1, wherein each ferromagnetic plate is fabricated from a ferromagnetic metal selected from ferrous steel, iron, nickel cobalt and alloys thereof.

11. The magnetic apparatus according to claim 1, wherein each magnet is a neodymium magnet.

12. A magnetic apparatus, comprising;

a plurality of ferromagnetic plates, each ferromagnetic plate includes an inwardly curved end for mounting on a curved ferromagnetic surface;

a plurality of magnets being configured in an alternating arrangement with the ferromagnetic plates wherein each magnet is positioned between a pair of the ferromagnetic plates, wherein the magnets are oriented so that the north pole of each magnet opposes the north pole of another magnet and the south pole of each magnet opposes the south pole of another magnet, and wherein each magnet is configured as a bar magnet that is sized so as to preclude the magnet from contacting the curved ferromagnetic surface; and an assembly for joining the ferromagnetic plates and magnets together such that each magnet firmly abuts said pair of the ferromagnetic plates thereby allowing the ferromagnetic plates to become magnetically saturated.

13. The magnetic apparatus according to claim 12, further comprising a load-spreading member being attached to all of the ferromagnetic plates for distributing loads among the ferromagnetic plates.

14. The magnetic apparatus according to claim 13, wherein each ferromagnetic plate includes a thru-hole therein, and wherein the load-spreading member is disposed within the thru-hole of each ferromagnetic plate.

15. A magnetic apparatus, comprising;

a plurality of ferromagnetic plates, each ferromagnetic plate includes a first thru-hole, a second thru-hole and an inwardly curved end for placement on a curved ferromagnetic surface;

a plurality of magnets in an alternating arrangement with the ferromagnetic plates such that each magnet is positioned between a pair of the ferromagnetic plates, wherein the magnets are oriented such that like magnetic poles of the magnets oppose each other, wherein each magnet is configured so that the magnet does not contact the curved ferromagnetic surface, each magnet includes a first thru-hole and a second thru-hole, wherein the first thru-hole of each ferromagnetic plate is aligned with the first thru-hole of each magnet, and wherein the second thru-hole of each ferromagnetic plate is aligned with the second thru-hole of each magnet; and an assembly for joining the ferromagnetic plates and magnets together so that each magnet firmly abuts said pair of the ferromagnetic plates thereby allowing the ferromagnetic plates to become magnetically saturated, wherein the assembly comprises a first elongate member extending through the first thru-holes of the ferromagnetic plates and magnets;

a first set of fasteners engaged with the first elongate member to retain the first elongate member within the first thru-holes of the ferromagnetic plates and magnets;

a second elongate member extending through the second thru-holes of the ferromagnetic plates and the magnets; and a second set of fasteners engaged with the second elongate member to retain the second elongate member within the second thru-holes of the ferromagnetic plates and the magnets.

16. The magnetic apparatus according to claim 15, wherein each ferromagnetic plate includes a first height and each magnet has a second height that is less than the first height.

17. The magnetic apparatus according to claim 16, wherein each magnet is a rectangular shaped magnet.

18. The magnetic apparatus according to claim 15, further comprising a load-spreading member being attached to all of the ferromagnetic plates for distributing loads among the ferromagnetic plates.

19. The magnetic apparatus according to claim 18, wherein each ferromagnetic plate includes a thru-hole therein, and wherein the load-spreading member is disposed within the thru-hole of each ferromagnetic plate.

20. The magnetic apparatus according to claim 15, wherein each ferromagnetic plate is fabricated from a ferromagnetic metal selected from ferrous steel, iron, nickel cobalt and alloys thereof.

* * * * *